(12) United States Patent
Agostinelli et al.

(10) Patent No.: US 6,802,613 B2
(45) Date of Patent: *Oct. 12, 2004

(54) BROAD GAMUT COLOR DISPLAY APPARATUS USING AN ELECTROMECHANICAL GRATING DEVICE

(75) Inventors: John A. Agostinelli, Rochester, NY (US); Marek W. Kowarz, Henrietta, NY (US); Louis S. Horvath, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/272,594

(22) Filed: Oct. 16, 2002

(65) Prior Publication Data

US 2004/0075817 A1 Apr. 22, 2004

(51) Int. Cl.[7] .............................................. G03B 21/00
(52) U.S. Cl. ........................................ 353/31; 353/122
(58) Field of Search ............................ 353/7, 8, 30, 31, 353/32, 33, 34, 37, 81, 122; 349/7, 8, 9, 10

(56) References Cited

U.S. PATENT DOCUMENTS

| | | | |
|---|---|---|---|
| 4,441,791 A | | 4/1984 | Hornbeck |
| 4,645,319 A | * | 2/1987 | Fekete .......................... 353/31 |
| 5,311,360 A | | 5/1994 | Bloom et al. |
| 5,398,086 A | * | 3/1995 | Nakano et al. ................ 353/31 |
| 5,535,047 A | | 7/1996 | Hornbeck |
| 5,570,213 A | | 10/1996 | Ruiz et al. |
| 5,600,383 A | | 2/1997 | Hornbeck |
| 5,620,755 A | | 4/1997 | Smith, Jr. et al. |
| 5,626,410 A | * | 5/1997 | Chambers et al. ............. 353/94 |
| 5,719,695 A | | 2/1998 | Heimbuch |
| 5,914,818 A | | 6/1999 | Tejada et al. |
| 5,930,050 A | | 7/1999 | Dewald |
| 6,008,951 A | | 12/1999 | Anderson |
| 6,089,717 A | | 7/2000 | Iwai |
| 6,191,826 B1 | | 2/2001 | Murakami et al. |
| 6,220,710 B1 | | 4/2001 | Raj et al. |
| 6,233,025 B1 | * | 5/2001 | Wallenstein ................. 348/750 |
| 6,256,073 B1 | | 7/2001 | Pettitt |
| 6,307,663 B1 | | 10/2001 | Kowarz |
| 6,411,425 B1 | * | 6/2002 | Kowarz et al. .............. 359/291 |

FOREIGN PATENT DOCUMENTS

WO     WO 01/95544 A2     12/2001

OTHER PUBLICATIONS

U.S. patent application Ser. No. 10/151,742, Roddy et al., filed May 20, 2002.
U.S. patent application Ser. No. 10/171,252, Kowarz et al., filed Jun. 12, 2002.

* cited by examiner

Primary Examiner—Alan A. Mathews
Assistant Examiner—Andrew Sever
(74) Attorney, Agent, or Firm—Stephen H. Shaw (57) ABSTRACT

An improved imaging apparatus having an expanded color gamut defined by more than three vertex colors for forming a color image on a display surface, that includes: a light source including at least one dichroic combiner for transmitting a first vertex color and reflecting a second vertex color toward a color combining element that directs, along an illumination axis, a colored illumination beam having, at any one time, any one of at least four different vertex colors; a linear array of electromechanical grating devices for receiving the colored illumination beam along the illumination axis; an obstructing element for blocking a zeroth order light beam reflected from the linear array of electromechanical grating devices from reaching the display surface; a projection lens cooperating with a scanning element, and a logic control processor.

44 Claims, 8 Drawing Sheets

BROAD GAMUT COLOR DISPLAY APPARATUS USING AN ELECTROMECHANICAL GRATING DEVICE

CROSS-REFERENCE TO RELATED APPLICATIONS

This application is related to the following co-pending U.S. patent applications of the same assignee: U.S. patent application Ser. No. 10/151,742 filed May 20, 2002 by James E. Roddy, et al., titled "Method And Apparatus For Increasing Color Gamut Of A Display" and U.S. patent application Ser. No. 10/171,252 filed Jun. 12, 2002 by Marek W. Kowarz, et al. titled "High-Contrast Display System with Scanned Conformal Grating Device."

FIELD OF THE INVENTION

This invention generally relates to display systems that form a two-dimensional image and more particularly relates to a color display apparatus and method for generating images having a broadened color gamut using electromechanical grating devices.

BACKGROUND OF THE INVENTION

Figure 1A:
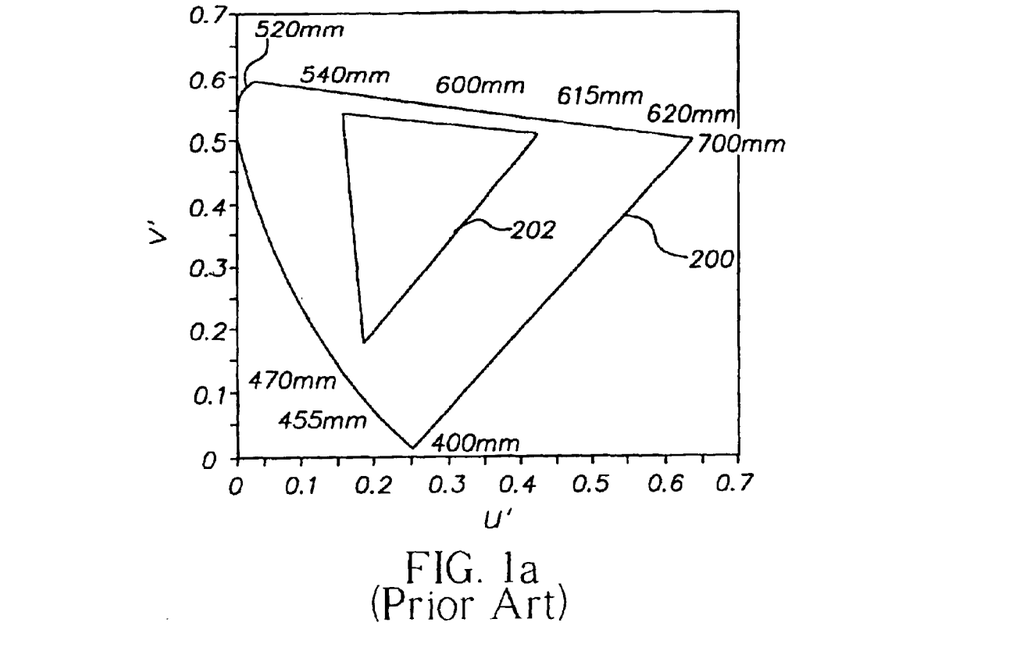
FIG. 1a is a prior art graph showing a typical color space as conventionally defined with three component vertex colors.

With the advent of digital technology and the demonstration of all-digital projection systems, there is considerable interest in increasing the range or gamut of colors that can be displayed in order to provide a more realistic, more vivid image than is possible with the gamut limitations of film dyes or phosphors. The familiar tristimulus CIE color model developed by Commission International de l'Eclairage (International Commission on Illumination) shows the color space perceived by a standard human observer. FIG. 1a shows the CIE color model, which represents a visible gamut 200 as a familiar "horseshoe" curve. Within visible gamut 200, the gamut of a conventional display device can be represented by a three-sided device gamut 202, such as standard SMPTE (Society of Motion Picture and Television Engineers) phosphors, for example. As is well known in the color projection arts, it is desirable for a display device to provide as much of visible gamut 200 as possible in order to faithfully represent the actual color of an image.

Referring to FIG. 1a, pure, saturated spectral colors are mapped to the "horseshoe" shaped periphery of visible gamut 200. The component colors of a display, typically Red, Green, and Blue (RGB) define the vertices of the polygon for a color gamut, thereby defining the shape and limits of device gamut 202. Ideally, these component colors are as close to the periphery of visible gamut 200 as possible. The interior of the "horseshoe" then contains all mappings of mixtures of colors, including mixtures of pure colors with white, such as spectral red with added white, which becomes pink, for example.

One simple strategy to increase the size of device gamut 202 is to use light sources that are spectrally pure, or have at least a good degree of spectral purity. Lasers, due to their inherent spectral purity, are particularly advantaged for maximizing device gamut 202. A second strategy for expanding color gamut is to move from the conventional triangular area of device gamut 202, as shown in FIG. 1a, to a polygonal area, shown as an expanded device gamut 204 in FIG. 1b. In order to do this, one or more additional component colors must be added.

There have been projection apparatus solutions proposed that may employ more than 3 component colors from various color light sources. For the most part, however, the solutions proposed have not targeted color gamut expansion; in some cases, added colors are not selected for spectral purity, but are selected for some other characteristic. Disclosures of projectors using more than three component color sources include the following: U.S. Pat. No. 6,256,073, Jul. 3, 2001 (Pettitt) discloses a projection apparatus using a filter wheel arrangement that provides four colors in order to maintain brightness and white point purity. However, the fourth color added in this configuration is not spectrally pure, but is white in order to add brightness to the display and to minimize any objectionable color tint. It must be noted that white is an "intragamut" color addition; in terms of color theory, adding white can actually reduce the color gamut. Similarly, U.S. Pat. No. 6,220,710 by Raj et al. issued Apr. 24, 2001 discloses the addition of a white light channel to standard R, G, B light channels in a projection apparatus. As was just noted, the addition of white light may provide added luminosity, but constricts the color gamut. U.S. Pat. No. 6,191,826 Feb. 20, 2001 (Murakami et al.) discloses a projector apparatus that uses four colors derived from a single white light source, where the addition of a fourth color, orange, compensates for unwanted effects of spectral distribution that affect the primary green color path. In the apparatus of U.S. Pat. No. 6,191,826, the specific white light source used happens to contain a distinctive orange spectral component. To compensate for this, filtering is used to attenuate undesirable orange spectral content from the green light component in order to obtain a green light having improved spectral purity. Then, with the motive of compensating for the resulting loss of brightness, a separate orange light is added as a fourth color. The disclosure indicates that some expansion of color range is experienced as a side effect. However, with respect to color gamut, it is significant to observe that the solution disclosed in U.S. Pat. No. 6,191,826 does not appreciably expand the color gamut of a projection apparatus. In terms of the color gamut polygon described above with reference to FIGS. 1a and 1b, addition of an orange light may add a fourth vertex; however, any added orange vertex would be very close to the line already formed between red and green vertices. Thus, the newly formed gamut polygon will, at best, exhibit only a very slight increase in area over the triangle formed using three component colors. Moreover, unless a substantially pure wavelength orange is provided, there could even be a small decrease in color gamut using the methods disclosed in U.S. Pat. No. 6,191,826.

It is worthwhile to note that none of the solutions listed above has targeted the expansion of the color gamut as a goal or disclosed methods for obtaining an expanded color gamut. In fact, for each of the solutions listed above, there can even be some loss of color gamut with the addition of a fourth color.

Figure 1B:
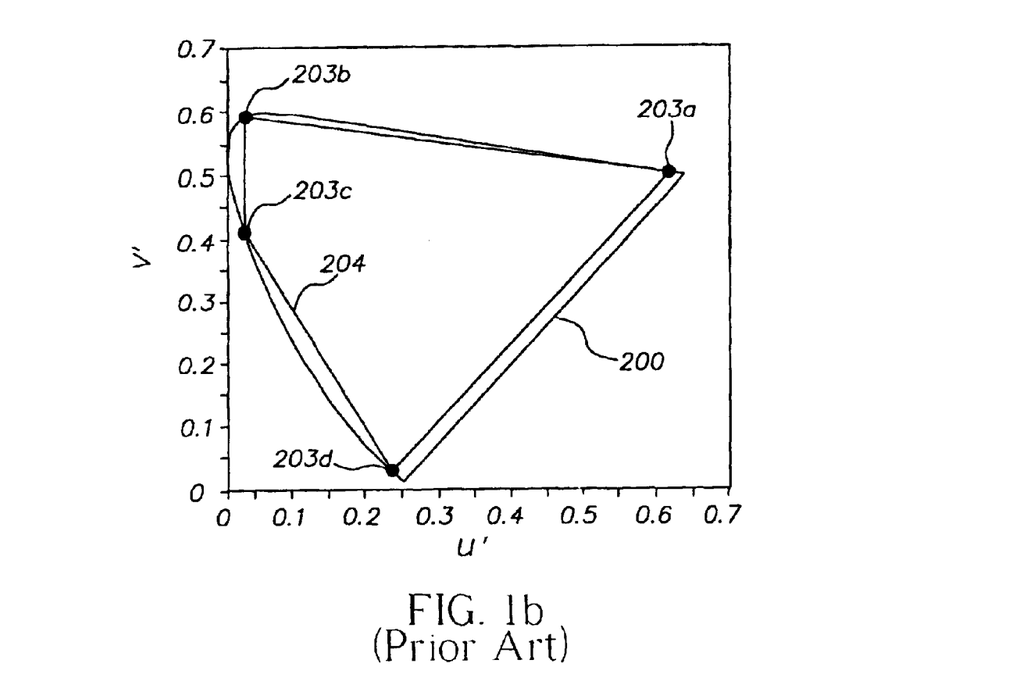
FIG. 1b is a prior art graph showing an expanded color space defined using four component vertex colors.

In contrast to the above patent disclosures, Patent Application WO 01/95544 A2 (Ben-David et al.) discloses a display device and method for color gamut expansion as shown in FIG. 1b using spatial light modulators with four or more substantially saturated colors. In one embodiment, Application WO 01/95544 teaches the use of a color wheel for providing each of the four or more component colors to a single spatial light modulator. In an alternate embodiment, this Application teaches splitting light from a single light source into four or more component colors and the deployment of a dedicated spatial light modulator for each component color. However, while the teaching of Application WO 01/95544 may show devices that provide improved color gamut, there are several drawbacks to the conventional design solutions disclosed therein. When multiplexing a single spatial light modulator to handle more than three colors, a significant concern relates to the timing of display data. The spatial light modulator employed must provide very high-speed refresh performance, with high-speed support components in the data processing path. Parallel processing of image data would very likely be required in order to load pixel data to the spatial light modulator at the rates required for maintaining flicker-free motion picture display. It must also be noted that the settling time for conventional LCD modulators, typically in the range of 10–20 msec for each color, further shortens the available projection time and thus constrains brightness. Loss of brightness, already an acknowledged disadvantage of tricolor color wheel solutions, becomes a successively larger problem with each additional color added, since a smaller proportionate amount of light is then available for any one color. Moreover, the use of a filter wheel for providing the successive component colors at a sufficiently high rate of speed has further disadvantages. Such a filter wheel must be rotated at very high speeds, requiring a precision control feedback loop in order to maintain precision synchronization with data loading and device modulation timing. The additional "dead time" during filter color transitions, already substantial in devices using three-color filter wheels, would further reduce brightness and complicate timing synchronization. Coupling the filter wheel with a neutral density filter, also rotating in the light path, introduces additional cost and complexity. Although rotating filter wheels have been adapted for color projection apparatus, the inherent disadvantages of such a mechanical solution are widely acknowledged. Alternative solutions using a spatial light modulator dedicated to each color introduce other concerns, including proper alignment for component colors. The disclosure of Application WO 01/95544 teaches the deployment of a separate projection system for each color, which would be costly and would require separate alignment procedures for each display screen size and distance. Providing illumination from a single light source results in reduced brightness and contrast. Thus, while the disclosure of Application WO 01/95544 teaches gamut expansion in theory, in practice there are a number of significant drawbacks to the design solutions proposed. As a studied consideration of Application WO 01/95544 clearly shows, problems that were difficult to solve for three-color projection, such as timing synchronization, color alignment, maintaining brightness and contrast, cost of spatial light modulators and overall complexity, are even more challenging when attempting to use four or more component vertex colors.

Currently, promising solutions for digital cinema projection and home theater systems employ, as image forming devices, one of two types of area spatial light modulators (SLMs). An area spatial light modulator has a two-dimensional array of light-valve elements, each element corresponding to an image pixel. Each array element is separately addressable and digitally controlled to modulate transmitted or reflected light from a light source. There are two salient types of area spatial light modulators that are conventionally employed for forming images in digital projection and printing apparatus: Digital Micro-Mirror Devices (DMDs) and Liquid-Crystal Devices (LCDs).

Prototype projectors using one or more DMDs have been demonstrated. DMD devices are described in a number of patents, for example U.S. Pat. No. 4,441,791 issued Apr. 10, 1984 to Hornbeck; U.S. Pat. No. 5,535,047 issued Jul. 9, 1996 to Hornbeck; U.S. Pat. No. 5,600,383 issued Feb. 4, 1997 to Hornbeck; and U.S. Pat. No. 5,719,695 issued Feb. 17, 1998 to Heimbuch. Optical designs for projection apparatus employing DMDs are disclosed in U.S. Pat. No. 5,914,818 issued Jun. 22, 1999 to Tejada et al.; U.S. Pat. No. 5,930,050 issued Jul. 27, 1999 to Dewald; U.S. Pat. No. 6,008,951 issued Dec. 28, 1999 to Anderson; and U.S. Pat. No. 6,089,717 issued Jul. 18, 2000 to Iwai. LCD apparatus are described, in part, in U.S. Pat. No. 5,570,213 issued Oct. 29, 1996 to Ruiz et al. and U.S. Pat. No. 5,620,755 issued Apr. 15, 1997 to Smith, Jr. et al.

While there has been some success with respect to RGB color representation using area spatial light modulators, there are significant limitations. Device timing and refresh cycles, for example, can be pushed to the limit for display apparatus using three source colors. Adapting a single LCD device to handle additional colors requires faster image data handling, allows even less refresh time, and reduces overall brightness. Using multiple LCDs can be costly and introduces alignment problems. LCDs exhibit a number of uniformity problems due to interference when used with laser sources. LCDs also present a particular challenge with respect to image contrast; it can be difficult to achieve the needed brightness levels, yet prevent stray light from the image path. Stray light prevents such devices from achieving the high quality black available with conventional film-based display devices. In summary, conventional approaches using LCDs and other two-dimensional spatial light modulators do not appear to offer the best solutions for providing display apparatus with a color gamut expanded from the existing 3-color model.

Linear arrays, which could also be considered as one-dimensional spatial light modulators, have some advantages over the two-dimensional LCD and DMD area spatial light modulators described above. Inherent performance advantages for linear arrays include the capability for higher resolution, reduced cost, and simplified illumination optics. Of particular interest: linear arrays are more suitable modulators for laser light than are their two-dimensional counterparts. For example, Grating Light Valve (GLV) linear arrays, as described in U.S. Pat. No. 5,311,360 issued May 10, 1994 to Bloom et al. are an earlier type of linear array that offers a workable solution for high-brightness imaging using laser sources.

Recently, an electromechanical conformal grating device consisting of ribbon elements suspended above a substrate by a periodic sequence of intermediate supports was disclosed in U.S. Pat. No. 6,307,663 issued Oct. 23, 2001 to Kowarz, entitled "Spatial Light Modulator With Conformal Grating Device". The electromechanical conformal grating device is operated by electrostatic actuation, which causes the ribbon elements to conform around the support substructure, thereby producing a grating. The device of U.S. Pat. No. 6,307,663 has more recently become known as the conformal GEMS device, with GEMS standing for Grating ElectroMechanical System. The conformal GEMS device possesses a number of attractive features. It provides high-speed digital light modulation with high contrast and good efficiency. In addition, in a linear array of conformal GEMS devices, the active region is relatively large and the grating period is oriented perpendicular to the array direction. This orientation of the grating period causes diffracted light beams to separate in close proximity to the linear array and to remain spatially separated throughout most of an optical system. When used with laser sources, GEMS devices provide excellent brightness, speed, and contrast.

U.S. Pat. No. 6,411,425 issued Jun. 25, 2002 to Kowarz et al. discloses an imaging system employing GEMS devices in a number of printing and display embodiments. As with its GLV counterpart, a GEMS device modulates a single color and a single line of an image at a time. Thus, forming a color image requires suitable techniques either for sequencing illumination and modulation data for each color to a single linear modulator or for combining separately modulated color images. With conventional RGB color systems, various techniques have been developed and used for color-sequential image-forming using three colors as well as for combining three separately modulated images. However, it can be appreciated that there are significant challenges in adapting these devices to a color display apparatus for providing images using more than three colors to produce an expanded color gamut.

In spite of the shortcomings of prior art solutions, it is recognized that there would be significant advantages in providing an image display having an expanded color gamut. Natural colors could be more realistically reproduced. At the same time, computer-generated images, not confined to colors and tones found in nature, could be represented more dramatically. Thus, there is a need for an improved imaging solution for viewing images having an expanded color gamut, where the solution provides a structurally simple apparatus, minimizes aberrations and image distortion, and meets demanding requirements for high contrast, high brightness, high speed, flexible operation, and lowered cost.

SUMMARY OF THE INVENTION

The present invention is directed to overcoming one or more of the problems set forth above by providing an improved imaging apparatus having an expanded color gamut defined by more than three vertex colors for forming a color image on a display surface, that includes: (a) a light source comprising at least one dichroic combiner for transmitting a first vertex color and reflecting a second vertex color toward a color combining element that directs, along an illumination axis, a colored illumination beam having, at one time, any one of at least four different vertex colors; (b) a linear array of electromechanical grating devices for receiving the colored illumination beam along the illumination axis; (c) an obstructing element for blocking a zeroth order light beam reflected from the linear array of electromechanical grating devices from reaching the display surface; (d) a projection lens cooperating with a scanning element for directing at least one diffracted light beam from the linear array of electromechanical grating devices toward the display surface, thereby forming a line image of the linear array on the display surface; and (e) a logic control processor for controlling timing of the light source and for providing image data to the linear array of electromechanical grating devices.

The present invention also provides a method for providing an expanded color gamut defined by more than three substantially monochromatic vertex colors for an imaging apparatus that forms a color image on a display surface, comprising: (a) providing, along an illumination axis, a colored illumination beam having, at any one time, any of at least four different vertex colors; (b) positioning a linear array of electromechanical grating devices for receiving the colored illumination beam along the illumination axis; (c) blocking a zeroth order of a light beam reflected from the linear array of electromechanical grating devices from reaching the display surface; (d) projecting a plurality of diffracted orders of the light beam toward a scanning element for directing the plurality of diffracted orders of the light beam toward the display surface; and, (e) controlling timing of the colored illumination beam and image data provided to the linear array of electromechanical grating devices.

ADVANTAGEOUS EFFECT OF THE INVENTION

It is an advantage of the present invention that it utilizes the inherent high resolution, high efficiency, and high contrast capabilities of both GLV and conformal GEMS devices.

It is a further advantage of the present invention that it employs image-forming devices capable of achieving the high brightness levels needed for large-scale display and projection applications.

It is a further advantage of the present invention that it allows expansion of color gamut by selective use of four or more source colors. The present invention also allows a display apparatus, with appropriate timing changes, the option to switch between number of colors used, depending on scene content, for example. The present invention also allows the option to alter the domain of a color gamut by selecting a subset of the available vertex colors.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

FIG. 2b is a schematic diagram showing a five-color light source that could be used with the device of FIG. 2a;

DETAILED DESCRIPTION OF THE INVENTION

The present description is directed in particular to elements forming part of, or cooperating more directly with an apparatus in accordance with the invention. It is to be understood that elements not specifically shown or described may take various forms well known to those skilled in the art.

A feature of the present invention is the use of one or more electromechanical grating devices to modulate light having four or more substantially monochrome vertex colors to provide a display apparatus with an expanded color gamut.

For the description that follows, components specific to a single color path may be more particularly identified with an letter appended to the part number. Where used, letters correspond to color paths; for example, "r" is appended for red, "b" for blue, "g" for green, "y" for yellow, "yg" for yellow-green, and "bg" for blue-green.

The term "vertex color" as used in this application refers to a component color emitted from a light source that defines a vertex of the color gamut polygon for a display apparatus. Referring back to FIG. 1b, for example, the four vertex colors of expanded device gamut 204 for an imaging apparatus define vertices 203a, 203b, 203c, and 203d. The term "substantially monochromatic vertex color" as used in this application refers to a vertex color that has a high degree of spectral purity. Ideally, a substantially monochromatic vertex color, such as from a laser, has a single wavelength. That is, for a substantially monochromatic vertex color, its vertex 203a, 203b, 203c, or 203d lies directly on the curve of visible gamut 200, as shown in FIG. 1b. This would maximize the color gamut. In practice, however, not all laser sources are spectrally pure, exhibiting this "ideal" monochromaticity; there can be some amount of unwanted spectral emission with certain classes of laser devices, such as short-pulse lasers, for example. In fact, there is a tradeoff between maximum color gamut and speckle reduction. With substantially monochromatic laser sources, undesirable speckle is maximized. With less-perfect laser emission, speckle is correspondingly reduced. Therefore, for high-quality display performance with minimal speckle, a substantially monochromatic vertex color would be suitably provided by a laser that is very nearly monochromatic, so that, with respect to FIG. 1b, its corresponding vertex 203a, 203b, 203c, or 203d is very near to the curve of visible gamut 200. By comparison, colors emitted by CRT phosphors and exhibiting broad spectral content, as is represented at the vertices of the triangular device gamut 202 in FIG. 1a, would not be considered to be substantially monochromatic vertex colors in the context of this application.

Embodiment with Single Electromechanical Grating Light Modulator 85 Device

Figure 2A:
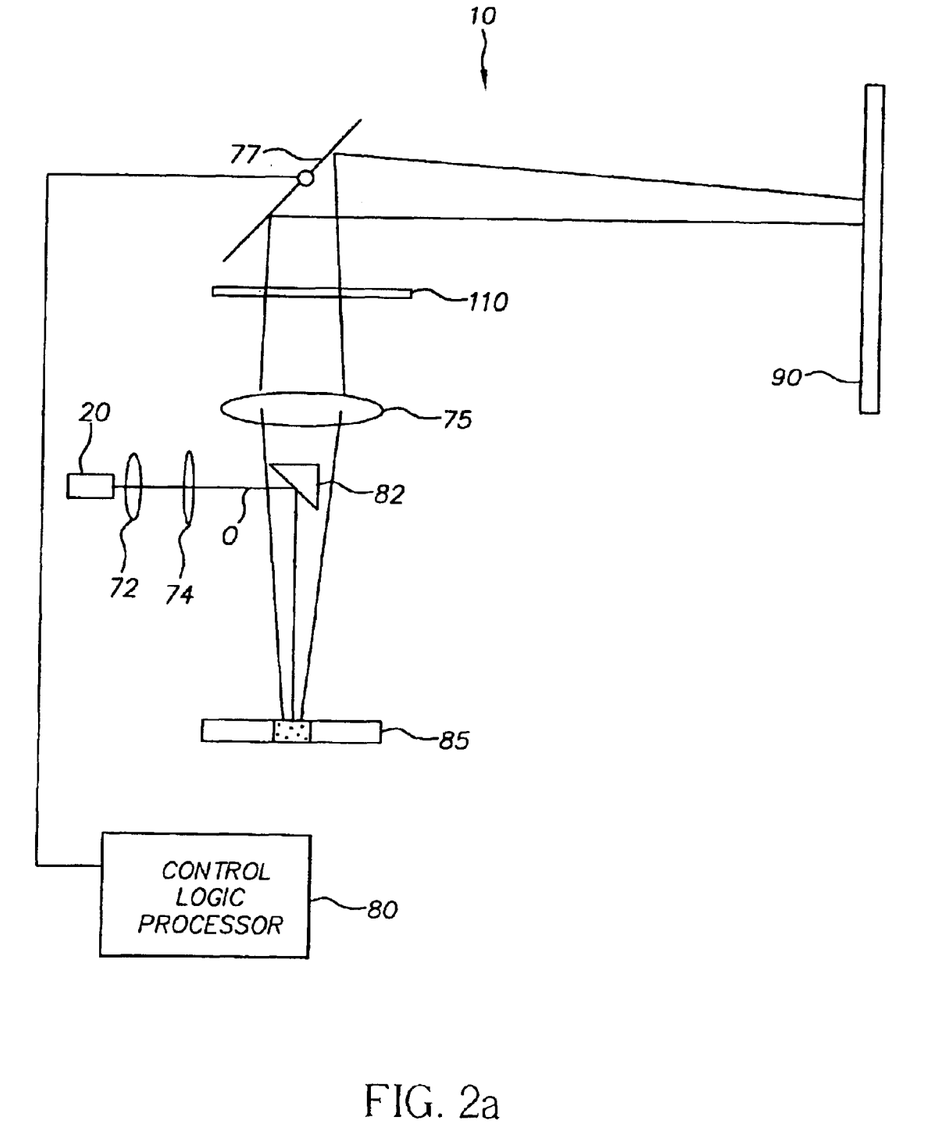
FIG. 2a is a schematic diagram showing the basic components for a display apparatus using conformal GEMS devices for image modulation.

Referring to FIG. 2a, display apparatus 10 shows the basic arrangement of components for forming and projecting an image using an electromechanical grating light modulator 85, a linear array of conformal GEMS devices in the preferred embodiment. A light source 20 provides illumination that is conditioned through a spherical lens 72 and a cylindrical lens 74 and directed toward a turning mirror 82. Light reflected from turning mirror 82 is modulated by diffraction at electromechanical grating light modulator 85. Modulated diffracted light from electromechanical grating light modulator 85 is diffracted past turning mirror 82 and directed by a lens 75 to a scanning mirror 77. Turning mirror 82 acts as an obstructing element for the zeroth order reflected light from electromechanical grating light modulator 85.

As scanning mirror 77 rotates, individual modulated line images from electromechanical grating light modulator 85 form a two-dimensional image on a display surface 90. A control logic processor 80 provides image modulation data, line by line, to electromechanical grating light modulator 85 based on the position of scanning mirror 77. Optionally, control of light source 20 may also be provided by control logic processor 80. For high optical efficiency and high contrast in one embodiment, the projected line of the image formed on display surface 90 is preferably formed from two or more diffracted orders of the modulated light from electromechanical grating light modulator 85. Display surface 90 is a front projection screen in one embodiment; however, similar structure and operation would be used for a rear projection surface such as a backlit display panel or other viewing surface.

An optional cross-order filter 110 can be placed near a Fourier (focal) plane of lens 75 to minimize projection of undesirable diffracted cross-orders in the modulated light. Scanning mirror 77 can be appropriately sized so that diffracted cross-order components of modulated light are directed outside its working area; this allows scanning mirror 77 to be functionally equivalent to cross order filter 110 for rejecting specific diffracted orders.

Figure 2B:
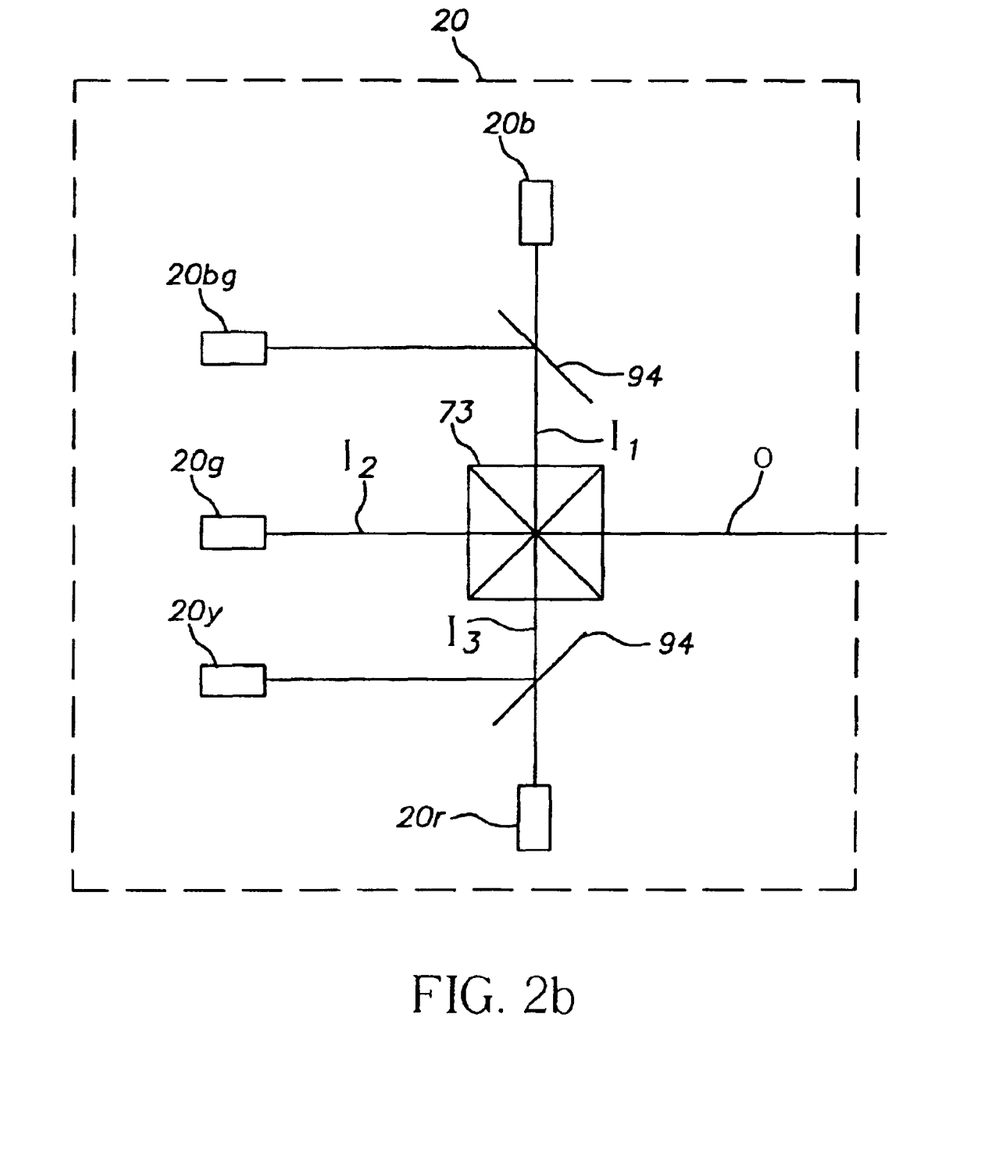

FIG. 2b shows, in schematic form, how light source 20 in the conventional model of FIG. 2a can be altered to allow the use of multiple vertex colors. In the example of FIG. 2b, light from any of a green light source 20g, a blue light source 20b, a yellow light source 20y, a blue-green light source 20bg, or a red light source 20r can be provided as source illumination along illumination axis O. A color-combining element 73, such as an X-cube, X-prism, or Philips prism can be used to direct colors along illumination axis O. Since the X-cube can accept input light from up to three directions, one or more input paths to the X-cube must be further shared by multiple colors, as is shown. For example, a dichroic combiner 94 combines vertex color light from blue light source 20b and blue-green light source 20bg onto input path $I_1$. Similarly, input path $I_3$ is shared for vertex color light from yellow light source 20y and red light source 20r using a second dichroic combiner 94. Input path $I_2$ in this example has only the light from green light source 20g. It must be emphasized that this set of five colors is just one example; other vertex colors could be employed, chosen using criteria such as spectral purity and suitability for providing desired results for improved color representation.

Embodiments with Multiple Electromechanical Grating Light Modulator 85 Devices

While the light source 20 arrangement of FIG. 2b could be used with the modulation and projection components of FIG. 2a, there are some obvious difficulties. Since electromechanical grating light modulator 85 modulates one color at a time, control logic processor 80 must synchronize the activation of any individual light source 20b, 20y, 20g, 20bg, or 20r with the image data provided to electromechanical grating light modulator 85 and with the rotation of scanning mirror 77. It may not be practical to switch between colors quickly enough to use the additional vertex colors effectively and maintain the needed brightness levels for a given display or for projection. Other complications include maintaining sufficient frame rates and considerations of overall dynamic range.

Figure 3:
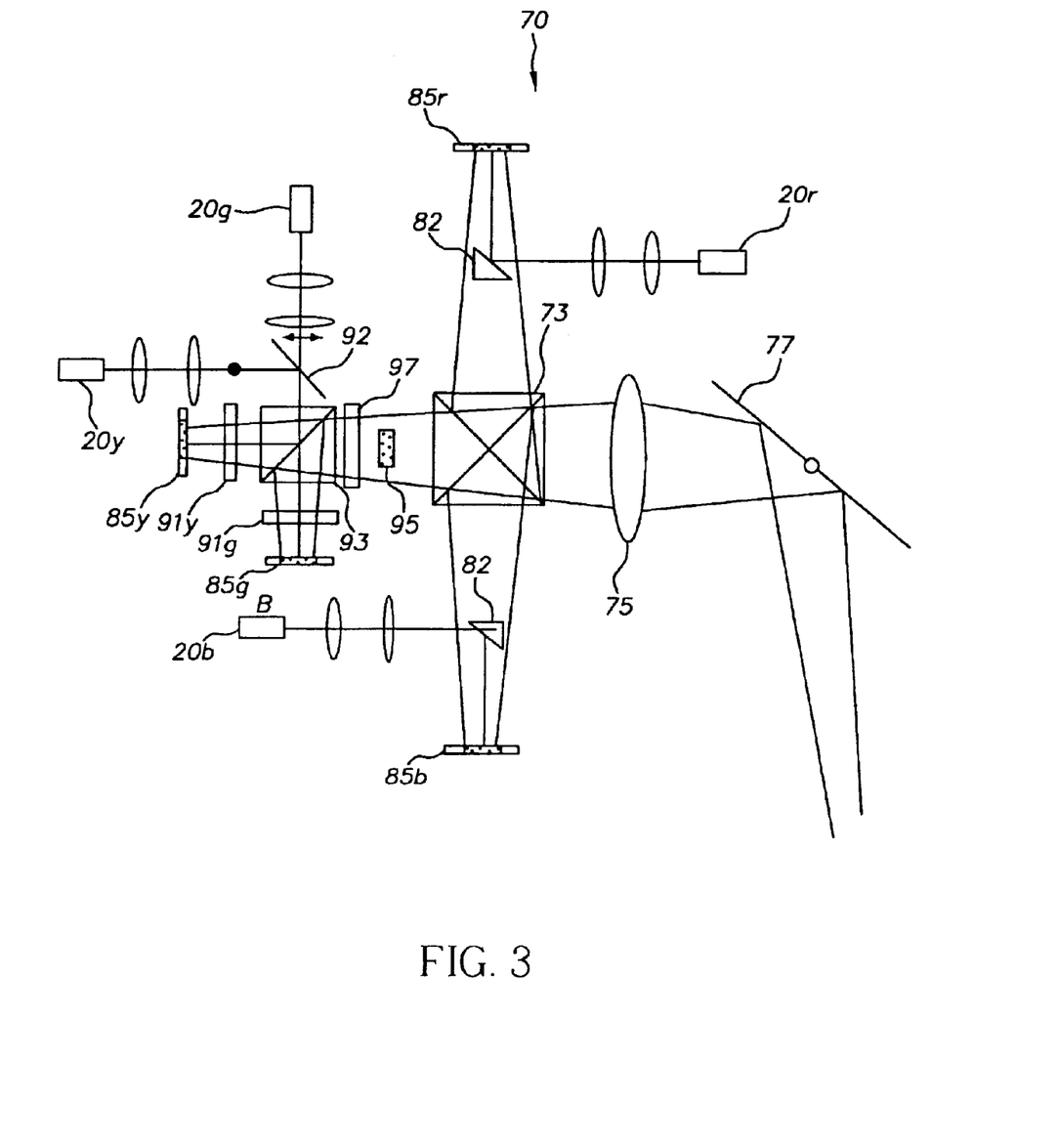
FIG. 3 is a schematic diagram of optics components for a four-color display apparatus using electromechanical grating devices.

Referring to FIG. 3, there is shown an embodiment of the present invention for a display apparatus 70 using four GEMS devices, one dedicated to each vertex color: electromechanical grating light modulator 85r modulates light from red light source 20r after striking turning mirror 82; electromechanical grating light modulator 85y modulates light from yellow light source 20y; electromechanical grating light modulator 85g modulates light from green light source 20g; electromechanical grating light modulator 85b modulates light from blue light source 20b after striking turning mirror 82. Again, color paths are combined, such as using an X-cube, at color combining element 73. The green and yellow color paths are combined using a dichroic combiner 92. Green light source 20g, has p-polarization in the embodiment shown in FIG. 3, as indicated by the double-arrow symbol, and yellow light source 20y, has s-polarization. These vertex colors are directed toward polarizing beamsplitter 93 by means of dichroic combiner 92. Alternately, based on polarization states of yellow light source 20y and green light source 20g, a second polarizing beamsplitter could be employed in place of dichroic combiner 92. Polarizing beamsplitter 93 transmits p-polarized light and reflects s-polarized light. The green light, having p-polarization is transmitted through polarizing beamsplitter 93 and through a waveplate 91g to electromechanical grating light modulator 85g. Modulated green light from electromechanical grating light modulator 85g, having s-polarization after passing again through waveplate 91g, is then reflected from polarizing beamsplitter 93, which directs the modulated light through color combining element 73. The yellow light is first reflected at dichroic combiner 92 and directed to polarizing beamsplitter 93. The yellow light, having s-polarization, is reflected from polarizing beamsplitter 93, transmitted through waveplate 91y and modulated by yellow electromechanical grating light modulator 85y. Modulated yellow light again passes through waveplate 91y and is transmitted through polarizing beamsplitter 93 and to color combining element 73. Waveplates 91g and 91y, preferably quarter-wave waveplates, rotate the polarization of incident (incoming) and of modulated (outgoing) green and yellow light, respectively. As a result, the modulated yellow light, transmitted through polarizing beamsplitter 93, is directed toward lens 75 and scanning mirror 77 by color combining element 73. A multiorder waveplate 97 corrects the polarization of modulated light that emerges from polarizing beamsplitter 93 so that both the modulated green and yellow light have the required polarization state for obtaining efficient handling by color combining element 73.

The arrangement given in FIG. 3 utilizes four electromechanical grating light modulators 85s, 85y, 85g, and 85b, each of which, dedicated to use with a single color, can operate at the same time. A stop 95 acts as an obstructing element, blocking zeroth-order reflection for any color path that combines two or more colors. In its simplest form, stop 95 would not be reflective.

Embodiments with Shared Electromechanical Grating Light Modulator 85 Devices

Figure 4:
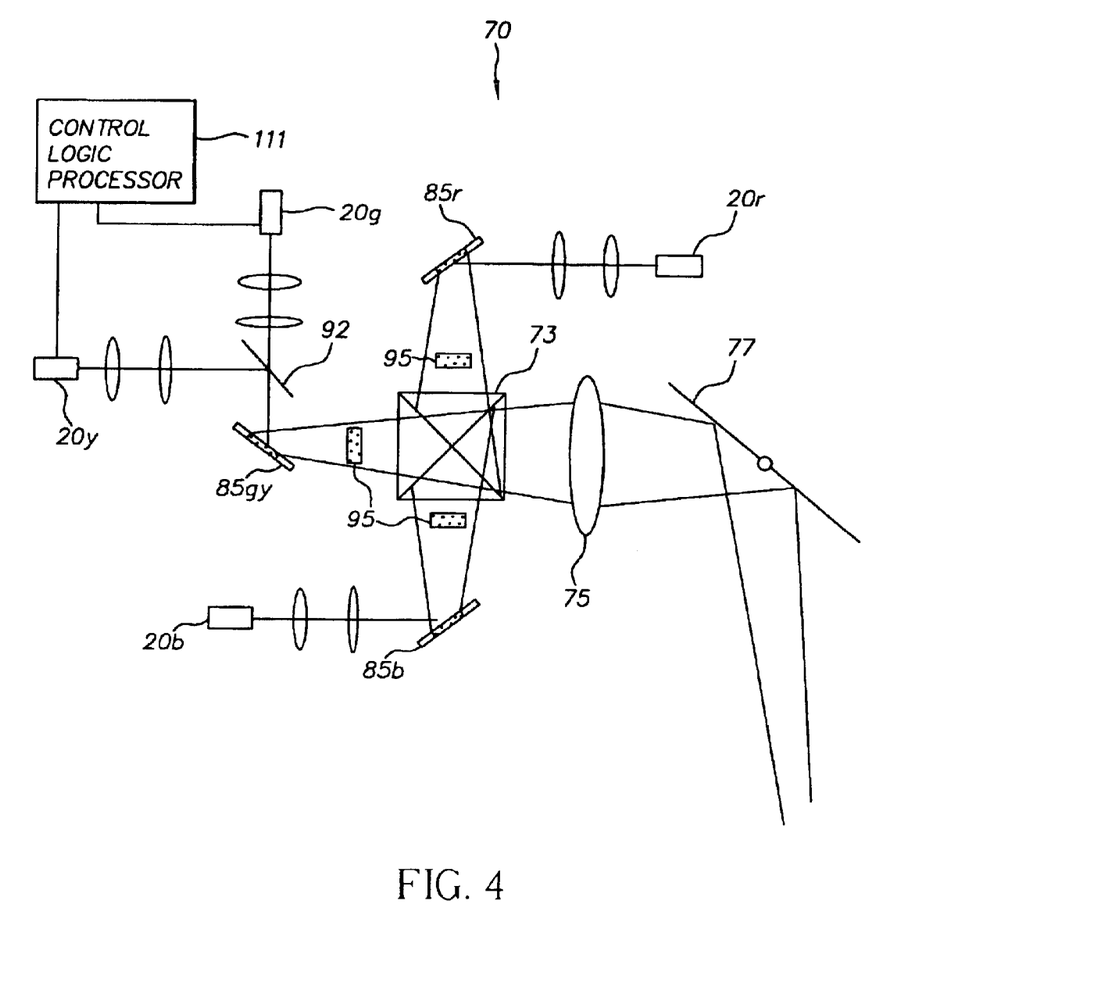
FIG. 4 is a schematic diagram showing optics components for a four-color display apparatus using three electromechanical grating devices.

It can be appreciated that there can be advantages to reducing the complexity and cost of display apparatus 70 without compromising image quality. Referring to FIG. 4, there is shown an alternate four-color display apparatus 70 that reduces cost by using only three electromechanical grating light modulators 85r, 85b, and 85gy. Disposed diagonally with respect to the surfaces of color combining element 73, the three electromechanical grating light modulators 85r, 85b, and 85gy do not require turning mirrors 82; only stops 95 are required to block zeroth-order reflection. Electromechanical grating light modulators 85r and 85b modulate red and blue color light from light sources 20r and 20b respectively and direct the modulated light, as diffracted orders, to color combining element 73. In turn, color combining element 73 directs modulated red and blue light, through lens 75 toward scanning mirror 77 for projection. Yellow and green color modulation, however, is handled differently. An electromechanical grating light modulator 85gy receives incident green light from light source 20g that is transmitted through dichroic combiner 92. Alternately, yellow light from light source 20y is reflected from dichroic combiner 92 and onto electromechanical grating light modulator 85gy. Since electromechanical grating light modulator 85gy can modulate only one color at a time, a control logic processor 111 is provided to alternatively illuminate light sources 20y and 20g for successive modulation of both colors (otherwise termed an alternate color modulated beam), at a rate that is not perceivable to a human observer, such as 60 Hz, for example. Control logic processor 111 synchronizes this control of color with its presentation of color image data to electromechanical grating light modulator 85gy. Where green and yellow light sources 20g and 20y are lasers, control logic processor 111 may be able to control illumination at a fast enough rate for this multiplexing activity by directly cycling laser power. Optionally, shutters (not shown) could be employed in the illumination path for this purpose.

Still referring to FIG. 4, it must be noted that it would be possible, by duplicating the pattern shown for yellow and green color paths, to further reduce cost such that only two electromechanical grating light modulators would be needed for four colors. That is, red and blue light sources 20r and 20b could also be directed to a separate dichroic combiner 92 and a single electromechanical grating light modulator 85r and 85b for red and blue light, respectively, could be controlled by control logic processor 111 to form a multiplexed color image including alternate color modulated beams, that would then be directed to color combining element 73. The arrangement of FIG. 4 is suitable for using either GLV or GEMS devices as electromechanical grating light modulators 85. However, for GLV devices, the three stops 95 would be replaced by a single stop 95 positioned at the Fourier plane of lens 75.

With the overall arrangement of FIG. 4, techniques for separating light using polarization could be employed, similar to those described with respect to FIG. 3, so that a polarizing beamsplitter 93 could be substituted for dichroic combiner 92. Again, however, this would require the use of a multiorder waveplate 97, so that, where two different colors are modulated by the same electromechanical grating light modulator 85, each modulated color has a suitable polarization state.

It is recognized that, when using color-multiplexed linear modulators, there can be unintended imaging anomalies due to slight misalignment of individual color lines as two-dimensional images are formed. Techniques to compensate for slight misalignment include periodically changing the timing sequence of colors that share the same electromechanical grating light modulator 85. With reference to the arrangement of FIG. 4 and electromechanical grating light modulator 85gy, for example, in an image frame N, green lines are projected first. In displaying the next image frame, N+1, the timing sequence is reversed, so that yellow lines are projected first rather than green line (1) thus alternating the timing sequence (2).

Figure 5:
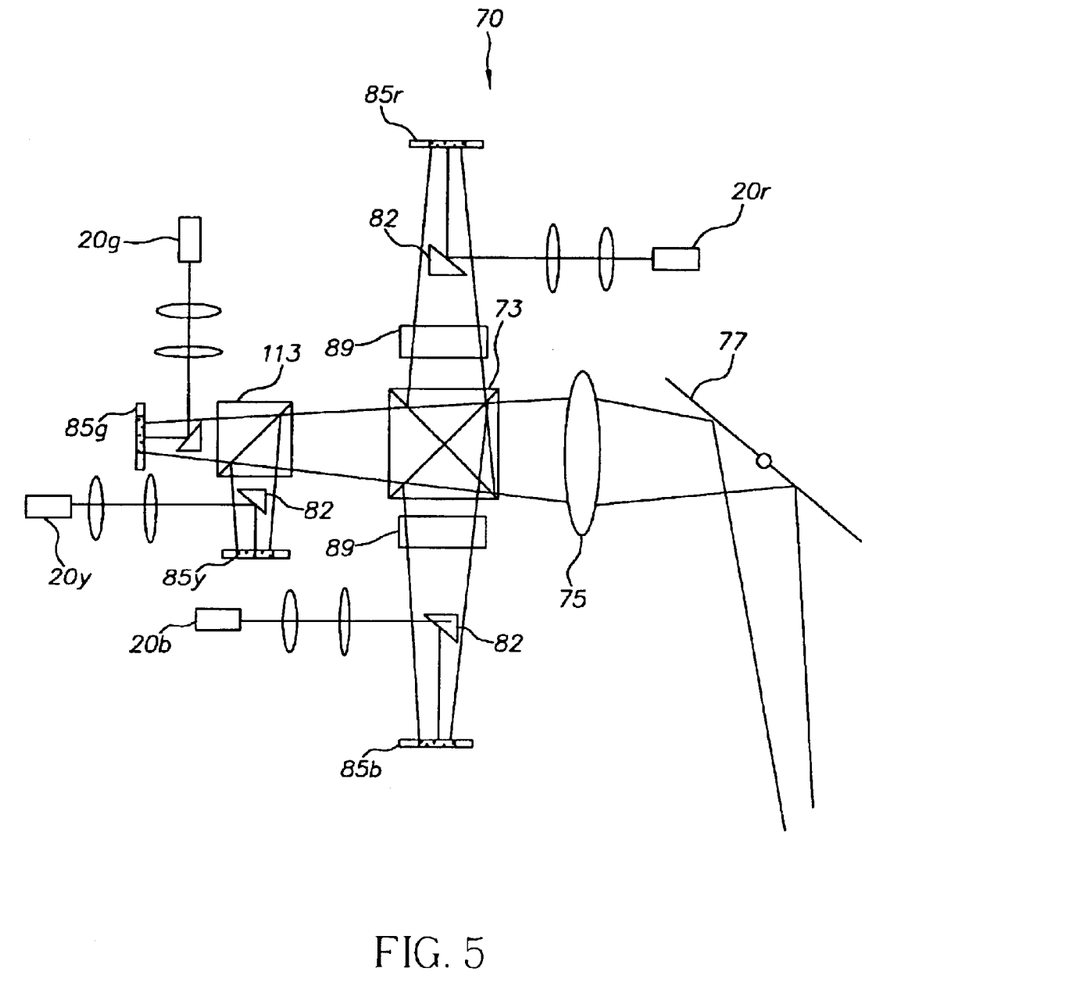
FIG. 5 is a schematic diagram showing optics components for a four-color display apparatus using four electromechanical grating devices.

Referring to FIG. 5, there is shown another alternate arrangement for combining color paths within display apparatus 70. Here, a dichroic combiner 113 is used for combining the green and yellow color modulation paths for color combining element 73. A separate electromechanical grating light modulator 85 is then used for each vertex color.

FIG. 5 also includes optional compensation elements 89 for equalizing the optical path lengths for red and blue color modulation. Compensation elements 89 could be cubes or other optical components situated in the optical path to help reduce imaging aberrations due to path length differences. Having a higher index of refraction than air, compensation elements 89 effectively lengthen an optical path length for one or more colors with respect to lens 75.

Further Techniques for Combining Light Sources

Figure 6:
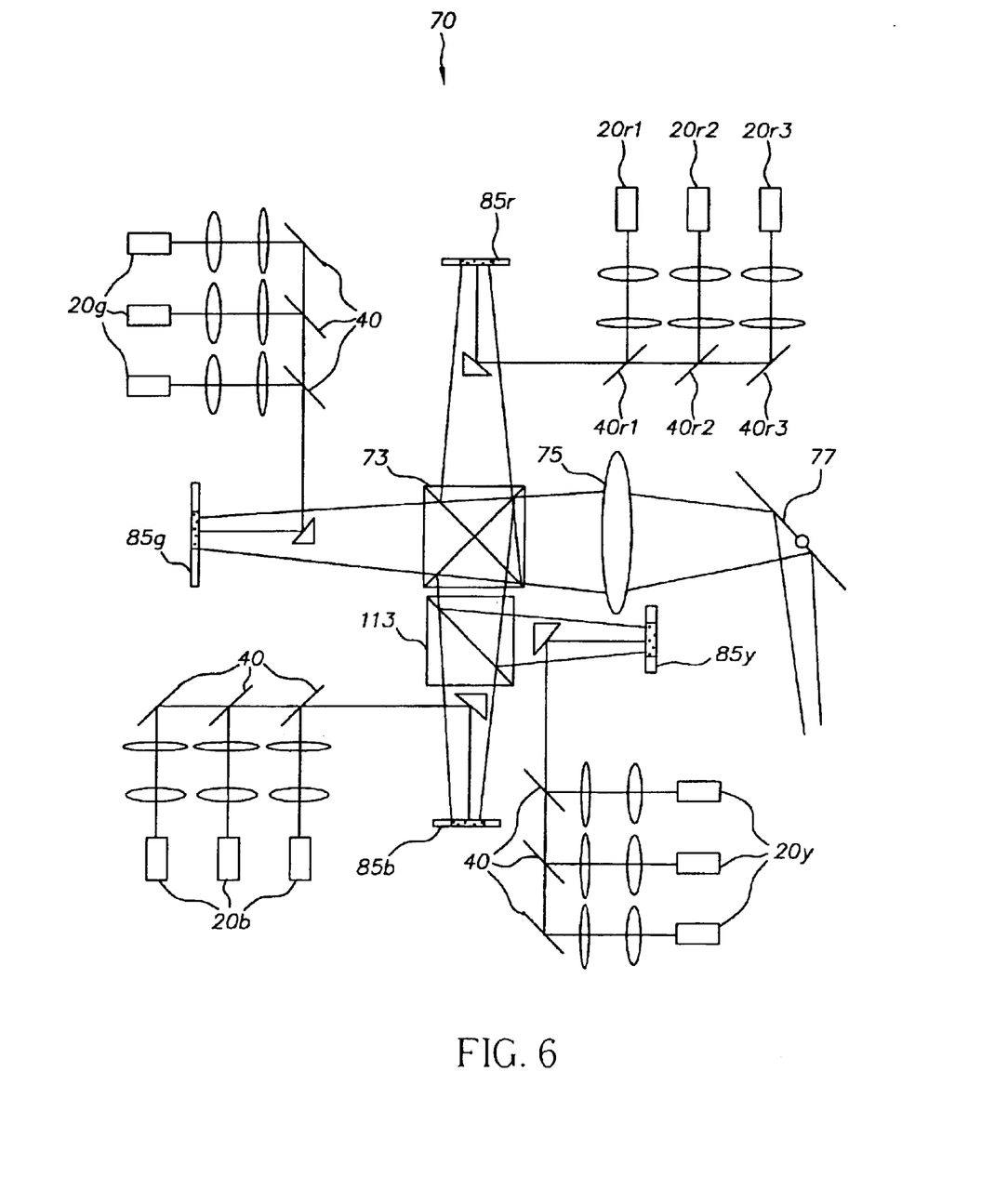
FIG. 6 is a schematic diagram showing optics components for a four-color display apparatus having a variable source brightness level for each color; and, FIG. 7 is a graph showing characteristic filter response over a narrow range of wavelengths that is utilized for the arrangement of FIG. 6.
Figure 7:
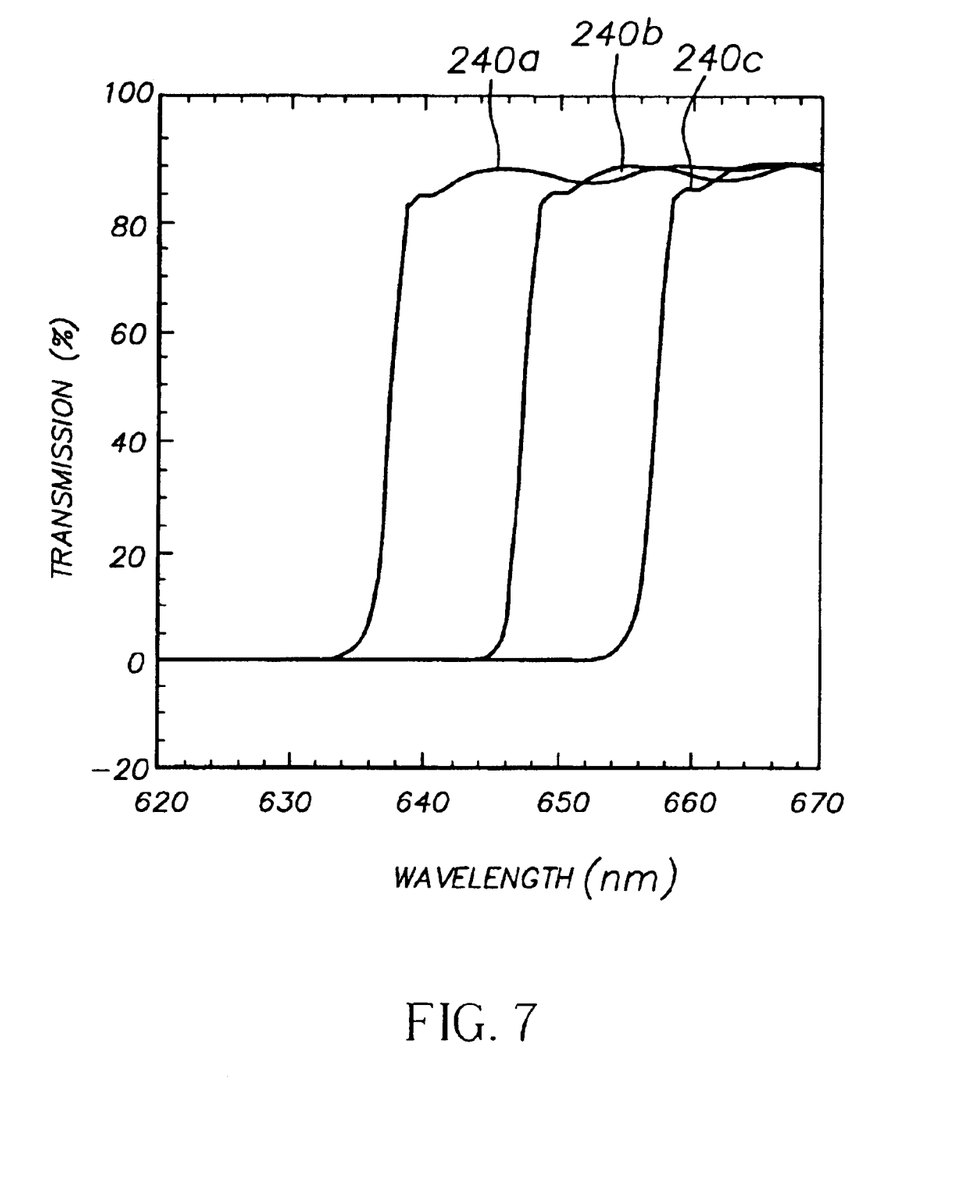

It is known that laser power can be boosted by combining one or more laser beams along a single light path. Referring to FIG. 6, display apparatus 70 has red, green, blue, and yellow electromechanical grating light modulators 85r, 85g, 85b, and 85y. Referring specifically to the red path, multiple red light sources 20r1, 20r2, and 20r3 are provided. Dichroic filters 40r1, 40r2, and 40r3 are used to combine the light from multiple red light sources 20r1, 20r2, and 20r3 along a single path for modulation by electromechanical grating light modulator 85r. In order to provide this function, it is necessary to match the output wavelengths of individual light sources 20r1, 20r2, and 20r3 with the filter characteristics of corresponding dichroic filters 40r1, 40r2, and 40r3. Referring to FIG. 7, there is shown a series of representative response curves 240a, 240b, and 240c for dichroic filters 40r1, 40r2, and 40r3 respectively. Curves 240a, 240b, and 240c plot filter transmission, as a percentage, against wavelength. Using this principle, as shown in FIG. 6, dichroic filter 40r1 reflects light from light source 20r1 and transmits light from light sources 20r2 and 20r3. Similarly, dichroic filter 40r2 reflects light from light source 20r2 and transmits light from light source 20r3. Dichroic filter 40r3 reflects light from light source 20r3 and could be designed to transmit light from one or more additional red sources 20r. Where light source 20r3 is the last in the series, a mirror could be substituted for dichroic filter 40r3 or light source 20r3 could be positioned to transmit directly through dichroic filter 40r2. This pattern requires that light sources 20r1, 20r2, and 20r3 be sorted according to their different wavelengths, varying from each other significantly enough to allow selective reflectance and transmission by dichroic filters 40r1, 40r2, and 40r3. Referring back to the example graph of FIG. 7, dichroic filter 40r1, matched to the output wavelength of light source 20r1, has the transmission response of curve 240a. This allows dichroic filter 40r1 to transmit red wavelengths of about 638 nm and higher with at least 80% efficiency. Dichroic filter 40r2, matched to the output wavelength of light source 20r2, has the transmission response of curve 240b. This allows dichroic filter 40r2 to transmit red wavelengths of about 648 nm and higher with at least 80% efficiency. Similarly, dichroic filter 40r2, matched to the output wavelength of light source 20r2 and with the transmission response of curve 240c, transmits red wavelengths of about 658 nm and higher with at least 80% efficiency. Using this pattern, the dichroic filter 40r1 having the lowest wavelength response passes all higher wavelengths; each succeeding dichroic filter 40 may be more restrictive.

The component arrangement of FIG. 6 allows additional brightness to be selectively added within each color path. This "ganged" arrangement may be useful for boosting the level of one or more component vertex colors. However, while this solution may increase brightness, there is necessarily some loss of color gamut, since spectral purity of the composite colors is diminished.

Role of Control Logic Processor 111

The role of control logic processor 111, as shown in FIG. 4, could be expanded in a number of ways for directing the operation of light sources 20r, 20g, 20b, 20y, 20bg, and others. With respect to the arrangement of FIG. 6, for example, control logic processor 111 (not shown in FIG. 6) can control the intensity of source illumination within one or more color modulation paths. Control logic processor 111 can selectively control which lasers are energized in which color channel. Control logic processor 111 can alternately control the sequencing of two different color light sources 20 that are directed to the same electromechanical grating light modulator 85, as was described with respect to FIG. 4.

In addition, control logic processor 111 may be programmed to select or inhibit the display of any color as desired, in order to optimize the viewing experience. Some types of scene content, for example, may be adequately displayed using only three vertex colors. For example, in conventional motion picture display projection, standard indoor scenes are realistically displayed using conventional red, green, and blue (RGB) color components. Conventional image data representation provides an RGB data value for each pixel component. Display apparatus 70, then, can faithfully display such scenes when operating in a three-color mode. For computer-generated scene material, however, the conventional RGB gamut (as was displayed in FIG. 1a) may be limiting. As is well known in the color representation arts, there are computer-generated colors that are not faithfully represented using RGB colorants alone. Thus, for computer-generated graphics, it can be beneficial to switch from standard 3-color representation to a 4-, 5-, or 6-color representation by display apparatus 70. Generally, the display apparatus 70 could be switched between displaying P– colors and P+1 colors based on scene content, where P is an integer. Alternately, different types of scenes may benefit from the added color gamut provided by a $4^{th}$, $5^{th}$, or $6^{th}$ vertex color. For example, the addition of a blue-green color component could enrich the display of an undersea scene. Or, the addition of a yellow component might add to the color representation of a desert or grass-lands scene.

Control logic processor 111 can, therefore, be used to control the number of colors that are enabled and used for each individual pixel or scene frame that displays, allowing display apparatus 70 to be switched between 3, 4, 5, 6, or more source colors, as needed, even within the same motion picture presentation, even between frames. Factors that can be used to determine whether or not additional vertex colors should be used include number of pixels for which enhanced color is useful and the amount of difference between a desired color and the conventional RGB color gamut, for example.

Control logic processor 111 itself may be embodied in a number of ways. In a preferred embodiment, control logic processor 111 is a dedicated PC workstation, housed within display apparatus 70. Control logic processor 111 could alternatively be embodied using a dedicated microprocessor, a logic gate array, or similarly adaptable logic device, for example.

Vertex Color Selection for Selectable Color Gamut

Referring back to FIG. 1b, it can be seen how display apparatus 10 (FIG. 2a) provides expanded device gamut 204 using four or more vertex colors, simply by building a larger polygon. As an alternative, display apparatus 10 also allows the option of providing more vertex colors, but using a smaller device gamut by using different sets having three vertex colors, as needed. For example, two alternate green wavelengths could be available. For some types of imaging, for example, a bluish green at vertex 203c may provide the optimal color gamut, so that the color gamut is a triangle defined by colors at vertices (203a, 203d, 203c). Other types of images might be better represented using a more yellowish green at vertex 203b, so that the preferred color gamut would be defined by vertex colors at vertices (203a, 203d, 203b). Display apparatus 10 could then be switched between the two slightly different gamuts defined by different sets of vertex colors (vertices 203a, 203d, 203c) and (vertices 203a, 203d, 203b) as needed for the most effective color representation. With this arrangement, display apparatus 10 effectively provides a selectable color gamut, allowing for scene content variations, user tone scale preferences, image capture conditions, and other variables.

Referring back to FIG. 6, the selective switching of light sources 20 in any color path could be used to serve either of two purposes. In the first case, as is described initially with reference to FIG. 6, multiple light sources in a color path could be energized in order to provide increased brightness for the color. For example, red light sources 20r1 and 20r2 could both be energized, with an additive effect on brightness in the red channel. In the second case, as is described above with respect to switching between gamuts, a specific light source in a color path could be energized to provide a vertex color. For example, red light source 20r2 could be energized instead of red light source 20r1, changing the resulting color gamut slightly. This capability for selecting multiple or alternate light sources can be used in any one or more color paths of display apparatus 70. This same principle could be applied for a display apparatus using three or more colors, using either area or linear spatial light modulators.

Optical Component Options

It must be pointed out that FIGS. 3, 4, 5, and 6, show only the components of display apparatus 70 that are used for color modulation. Scanning, projection, and display functions can use components well-known to those skilled in the digital image display arts. Scanning mirror 77 is the simplest of a set of possible devices for scanning the image, one line at a time, toward display surface 90.

FIGS. 3, 4, 5, and 6 show a preferred selection of colors that allow a broad color gamut: red, green, blue, and yellow. However, it must be emphasized that a different selection of colors might be appropriate for specific types of images or viewing conditions, within the scope of the present invention.

Because of their inherent brightness, narrow beam profile, and high spectral purity, lasers are the light sources 20 used for the preferred embodiment. Bright LEDs or alternate light sources could be used, although with less satisfactory results than lasers would provide.

Color combining elements typically comprise one or more dichroic surfaces that have been fabricated for reflecting or transmitting light at various wavelengths. FIGS. 2b, 3, 4, 5, and 6 show X-cubes or X-prisms that operate based on crossed dichroic surfaces, used for color combining. However, other arrangements of color combining dichroic surfaces may alternatively be used for directing multiple input colors into a single output color path.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. For example, the preferred embodiment of the present invention employs electromechanical grating light modulators 85, due to their particular advantages such as brightness and speed. However, the methods and apparatus disclosed herein could be more generally applied to display apparatus 10 that employ spatial light modulators or other types of linear modulators.

Thus, what is provided is an apparatus and method for a display apparatus using electromechanical grating devices and having an enhanced color gamut defined by more than three substantially monochromatic vertex colors for forming a two-dimensional color image on a display surface.

| | |
|---|---|
| 10 | display apparatus |
| 20 | light source |
| 20g | green light source |
| 20b | blue light source |
| 20y | yellow light source |
| 20bg | blue-green light source |
| 20r | red light source |
| 20r1 | red light source |
| 20r2 | red light source |
| 20r3 | red light source |
| 40 | dichroic filter |
| 40r1 | dichroic filter |
| 40r2 | dichroic filter |
| 40r3 | dichroic filter |
| 70 | display apparatus |
| 72 | spherical lens |
| 73 | color combining element |
| 74 | cylindrical lens |
| 75 | lens |
| 77 | scanning mirror |
| 80 | control logic processor |
| 82 | turning mirror |
| 85 | electromechanical grating light modulator |
| 85r | electromechanical grating light modulator, red |
| 85g | electromechanical grating light modulator, green |
| 85b | electromechanical grating light modulator, blue |
| 85y | electromechanical grating light modulator, yellow |
| 85gy | electromechanical grating light modulator, green and yellow |
| 89 | compensation elements |
| 90 | display surface |
| 91g | retarder, green |
| 91y | retarder, yellow |
| 92 | dichroic combiner |
| 93 | polarizing beamsplitter |
| 94 | dichroic combiner |
| 95 | stop |
| 97 | multiorder waveplate |
| 110 | cross-order filter |
| 111 | control logic processor |
| 113 | dichroic combiner |
| 200 | visible gamut |
| 202 | device gamut |
| 203a | vertice |
| 203b | vertice |
| 203c | vertice |
| 203d | vertice |
| 204 | expanded device gamut |
| 240a | curve |
| 240b | curve |
| 240c | curve |

What is claimed is:

1. An imaging apparatus having an expanded color gamut defined by more than three vertex colors for forming a color image on a display surface, comprising:

(a) a light source including at least one dichroic combiner for transmitting a first vertex color and reflecting a second vertex color toward a color combining element that directs, along an illumination axis, a colored illumination beam having, at any one time, any one of at least four different vertex colors;

(b) a linear array of electromechanical grating devices for receiving the colored illumination beam along the illumination axis;

(c) an obstructing element for blocking a zeroth order light beam reflected from the linear array of electromechanical grating devices from reaching the display surface;

(d) a projection lens cooperating with a scanning element for directing at least one diffracted light beam from the linear array of electromechanical grating devices toward the display surface, thereby forming a line image of the linear array on the display surface; and (e) a logic control processor for controlling timing of the light source and for providing image data to the linear array of electromechanical grating devices.

2. The imaging apparatus having an expanded color gamut according to claim 1 wherein the linear array of electromechanical grating devices is taken from the group consisting of GLV and conformal GEMS devices.

3. The imaging apparatus having an expanded color gamut according to claim 1 wherein the display surface is selected from the group consisting of front projection screen and rear projection surface.

4. The imaging apparatus having an expanded color gamut according to claim 1 wherein the light source comprises a laser.

5. The imaging apparatus according to claim 1 further comprising a cross-order filter for blocking a plurality of diffracted cross-order light beams from reaching the display surface.

6. The imaging apparatus according to claim 1 wherein the obstructing element is also used for directing the colored illumination beam toward the linear array of electromechanical grating devices.

7. The imaging apparatus according to claim 1 wherein the color combining element is taken from the group consisting of X-cube and Philips prism.

8. The imaging apparatus according to claim 1 wherein the light source further comprises a second dichroic combiner for transmitting a third vertex color and reflecting a fourth vertex color toward the color combining element for forming the colored illumination beam.

9. The imaging apparatus according to claim 1 wherein the light source comprises color combining means for forming the illumination beam having any of the at least four different vetex colors.

10. The imaging apparatus according to claim 1 wherein the colored illumination beam is substantially monochromatic.

11. An imaging apparatus having a color gamut defined by more than three vertex colors for forming a color image on a display surface, comprising:
(a) a two-color modulation system for providing a first color modulated beam, the system comprising:
(a1) a first vertex color light source and a second vertex color light source;
(a2) a combiner for directing light from the first vertex color light source and the second vertex color light source along a common illumination axis to provide a color illumination beam;
(a3) a first linear array of electromechanical grating devices for diffracting, according to image data, the color illumination beam received along the common illumination axis, thereby forming the first color modulated beam;
(a4) an obstructing element for blocking a zeroth order light beam reflected, from the first color modulated beam, from reaching the display surface;
(b) control means for selectively energizing, at any one time, either the first vertex color light source or the second vertex color light source and providing, to the first linear array of electromechanical grating devices, the image data corresponding to the energized first or second color light source;
(c) a third vertex color light source directed toward a second linear array of electromechanical grating devices for diffracting light from the third vertex color light source to provide a second color modulated beam according to image data from the control means;

(d) a fourth vertex color light source directed toward a third linear array of electromechanical grating devices for diffracting light from the fourth vertex color light source to provide a third color modulated beam according to image data from the control means;
(e) a combiner for combining, along a single projection axis, the first, second, and third color modulated beams to form a multicolor modulated beam; and
(f) a projection lens cooperating with a scanning element for directing at least one diffracted light beam from the multicolor modulated beam toward the display surface, thereby forming a line image on the display surface.

12. The imaging apparatus according to claim 11 wherein the first, second, and third linear array of electromechanical grating devices are taken from the group consisting of GLV and conformal GEMS devices.

13. The imaging apparatus according to claim 11 wherein the display surface is selected from the group consisting of front projection screen and rear projection surface.

14. The imaging apparatus according to claim 11 wherein the first vertex color light source comprises a laser.

15. The imaging apparatus according to claim 11 further comprising a cross-order filter for blocking a plurality of diffracted cross-order light beams from reaching the display surface.

16. The imaging apparatus according to claim 11 wherein the obstructing element is also used for directing the colored illumination beam toward the first, second, or third linear array of electromechanical grating devices.

17. The imaging apparatus according to claim 11 wherein the first vertex color light source is substantially monochromatic.

18. An imaging apparatus having an expanded color gamut defined by more than three vertex colors for forming a color image as a series of lines on a display surface, comprising:
(a) a first two-color modulation system for providing a first alternate color modulated beam, the first two-color modulation system comprising:
(a1) a first vertex color light source and a second vertex color light source;
(a2) a first combiner for directing light from the first vertex color light source and the second vertex color light source along a first common illumination axis to provide a first illumination beam;
(a3) a first linear array of electromechanical grating devices for diffracting the first illumination beam received along the first common illumination axis according to image data;
(a4) a first obstructing element for blocking a first zeroth order light beam reflected from the first linear array of electromechanical grating devices from reaching the display surface;
control logic means selecting, at any one time, either the first vertex color light source or the second vertex color light source and for providing the image data corresponding to the first or the second vertex color light source;
(b) a second two-color modulation system for providing a second alternate color modulated beam, the second two-color modulation system comprising:
(b1) a third vertex color light source and a fourth vertex color light source;
(b2) a second combiner for directing light from the third vertex color light source and the fourth vertex color light source along a second common illumination axis to provide a second illumination beam;
(b3) a second linear array of electromechanical grating devices for diffracting the second illumination beam received along the second common illumination axis according to image data;

(b4) a second obstructing element for blocking a second zeroth order light beam reflected from the second linear array of electromechanical grating devices from reaching the display surface;

the control logic means enabling, at any one time, either the third vertex color light source or the fourth vertex color light source and for providing the image data corresponding to the third or the fourth vertex color light source;

(c) an imaging beam combiner for combining, as a final output color beam along a single projection axis, the first and second alternate color modulated beams; and, (d) a projection lens cooperating with a scanning element for directing at least one diffracted light beam from the final output color beam toward the display surface, thereby forming a line image on the display surface.

19. The imaging apparatus having an expanded color gamut according to claim 18 wherein the first linear array of electromechanical grating devices is taken from the group consisting of GLV and conformal GEMS devices.

20. The imaging apparatus having an expanded color gamut according to claim 18 wherein the display surface is selected from the group consisting of front projection screen and rear projection surface.

21. The imaging apparatus having an expanded color gamut according to claim 18 wherein the first vertex color light source comprises a laser.

22. The imaging apparatus having an expanded color gamut according to claim 18 wherein the first obstructing element is also used for directing the first illumination beam toward the first linear array of electromechanical grating devices.

23. The imaging apparatus having an expanded color gamut according to claim 18 wherein the imaging beam combiner is selected from the group consisting of X-cube and Philips prism.

24. The imaging apparatus having an expanded color gamut according to claim 18 wherein the first vertex color light source is substantially monochromatic.

25. An imaging apparatus having an expanded color gamut defined by more than three vertex colors for forming a color image as a series of lines scanned onto a display surface, comprising:

(a) a first vertex color light source directed toward a first linear array of electromechanical grating devices for diffracting light to provide a first color modulated beam;

(b) a second vertex color light source directed toward a second linear array of electromechanical grating devices for diffracting light to provide a second color modulated beam;

(c) a third vertex color light source directed toward a third linear array of electromechanical grating devices for diffracting light to provide a third color modulated beam;

(d) a fourth vertex color light source directed toward a fourth linear array of electromechanical grating devices for diffracting light to provide a fourth color modulated beam;

(e) a first combiner for combining the first and second color modulated beams to form a dual-color modulated beam;

(f) a second combiner for combining the dual-color modulated beam, the third color modulated beam and the fourth color modulated beams to form a multicolor modulated beam;

(g) a projection lens cooperating with a scanning element for directing at least one diffracted light beam from the multicolor modulated beam toward the display surface, thereby forming a line image on the display surface; and (h) control means for providing image data to the first, second, third, and fourth linear arrays of electromechanical grating devices.

26. The imaging apparatus according to claim 25 wherein the first combiner is a polarizing beamsplitter.

27. The imaging apparatus according to claim 25 wherein the first combiner is a dichroic combiner.

28. The imaging apparatus according to claim 25 wherein the first vertex color light source comprises:

(a) a first laser having a first wavelength;

(b) a second laser having a second wavelength; and (c) a dichroic mirror for reflecting light from the first laser and transmitting light from the second laser;

whereby both the first laser and the second laser contribute to the first vertex color light source.

29. The imaging apparatus according to claim 25 wherein the fourth vertex color light source comprises:

(a) a first laser having a first wavelength;

(b) a second laser having a second wavelength; and (c) a dichroic mirror for reflecting light from the first laser and transmitting light from the second laser;

whereby both the first laser and the second laser contribute to the fourth vertex color light source.

30. The imaging apparatus according to claim 25 further comprising a compensator element for compensating for an optical path length difference.

31. The imaging apparatus having an expanded color gamut according to claim 25 wherein the second combiner is selected from the group consisting of X-cube and Philips prism.

32. A display apparatus having at least three colors, comprising:

(a) a first color light source that includes:
(i) a first laser having a first wavelength;
(ii) a second laser having a second wavelength; and,
(iii) a dichroic mirror for reflecting light from the first laser and transmitting light from the second laser;

(b) control means that selectively energizes either:
(i) the first laser to provide a first vertex color at the first wavelength; or,
(ii) the second laser to provide the first vertex color at the second wavelength; or,
(iii) both the first and the second lasers to provide the first vertex color with increased brightness;

(c) a first modulator for modulating the first vertex color to provide a first color modulated beam;

(d) combining means for combining the first color modulated beam with one or more additional color modulated beams to form a multicolor modulated beam; and, (e) a projection lens for projecting the multicolor modulated beam toward a display surface.

33. The display apparatus according to claim 32 wherein the first modulator is a linear array of electromechanical grating devices.

34. The display apparatus according to claim 33 wherein the projection lens cooperates with a scanning element for directing the multicolor modulated beam toward the display surface, thereby forming a line image on the display surface.

35. A method for providing an expanded color gamut defined by more than three substantially monochromatic vertex colors for an imaging apparatus that forms a color image on a display surface, comprising:

(a) providing, along an illumination axis, a colored illumination beam having, at any one time, any of at least four different vertex colors;

(b) positioning a linear array of electromechanical grating devices for receiving the colored illumination beam along the illumination axis;

(c) blocking a zeroth order of a light beam reflected from the linear array of electromechanical grating devices from reaching the display surface;

(d) projecting a plurality of diffracted orders of the light beam toward a scanning element for directing the plurality of diffracted orders of the light beam toward the display surface; and, (e) controlling timing of the colored illumination beam and image data provided to the linear array of electromechanical grating devices.

36. A method for providing an imaging apparatus having an expanded color gamut defined by more than three substantially monochromatic vertex colors for forming a color image on a display surface, comprising:

(a) providing a two-color modulation system for forming a first color modulated beam along a single illumination axis, by:

(a1) providing a first vertex color light source and a second vertex color light source;

(a2) alternately directing light from the first vertex color light source and the second vertex color light source along a common illumination axis to provide a color illumination beam;

(a3) positioning a first linear array of electromechanical grating devices for diffracting the color illumination beam received along the common illumination axis, according to image data; and (a4) blocking a zeroth order light beam reflected from the first linear array of electromechanical grating devices from reaching the display surface;

(b) providing a second color modulated beam by directing light from a third vertex color light source toward a second linear array of electromechanical grating devices for modulation according to the image data;

(c) providing a third color modulated beam by directing light from a fourth vertex color light source toward a third linear array of electromechanical grating devices for modulation according to the image data;

(d) combining, along a single projection axis, the first color modulated beam, the second color modulated beam, and the third color modulated beam to form a multicolor modulated beam; and, (e) projecting the multicolor modulated beam toward a scanning element to form successive lines of the color image on the display surface.

37. The method for providing an imaging apparatus having an expanded color gamut according to claim 36 wherein the step of alternately directing light from the first vertex color light source and from the second vertex color light source further comprises the step of periodically adjusting an alternating timing sequence.

38. A method for providing an imaging apparatus having an expanded color gamut defined by more than three substantially monochromatic vertex colors for forming a color image as a series of lines on a display surface, the method comprising:

(a) providing a first alternate color modulated beam by the steps of:

(a1) providing a first illumination beam by alternately directing light from a first vertex color light source and a second vertex color light source along a first common illumination axis;

(a2) providing color image data, according to the color of the first illumination beam, to a first linear array of electromechanical grating devices for diffracting the first illumination beam received along the first common illumination axis; and (a3) blocking the zeroth order light beam reflected from the first linear array of electromechanical grating devices from reaching the display surface;

(b) providing a second alternate color modulated beam by the steps of:

(b1) providing a second illumination beam by alternately directing light from a third vertex color light source and a fourth vertex color light source along a second common illumination axis;

(b2) providing color image data, according to the color of the second illumination beam, to a second linear array of electromechanical grating devices for diffracting the second illumination beam received along the second common illumination axis; and (b3) blocking the zeroth order light beam reflected from the second linear array of electromechanical grating devices from reaching the display surface;

(c) combining, as a final output color beam along a single projection axis, the first and second alternate color modulated beams; and, (d) projecting at least one diffracted light beam from the final output color beam toward a scanning element to direct the final output color beam toward the display surface as a line of image pixels.

39. The method for providing an imaging apparatus having an expanded color gamut according to claim 38 wherein the step of providing a first illumination beam further comprises the step of periodically adjusting an alternating timing sequence.

40. A method for providing an imaging apparatus having an expanded color gamut defined by more than three vertex colors for forming a color image as a series of lines on a display surface, the method comprising:

(a) forming a first color modulated beam by directing a first vertex color light source toward a first linear array of electromechanical grating devices for diffraction according to first color image data;

(b) forming a second color modulated beam by directing a second vertex color light source toward a second linear array of electromechanical grating devices for diffraction according to second color image data;

(c) forming a third color modulated beam by directing a third vertex color light source toward a third linear array of electromechanical grating devices for diffraction according to third color image data;

(d) forming a fourth color modulated beam by directing a fourth vertex color light source toward a fourth linear array of electromechanical grating devices for diffraction according to fourth color image data;

(e) combining the first and second color modulated beams to form a dual-color modulated beam;

(f) combining the dual-color modulated beam, the third color modulated beam and the fourth color modulated beams to form a multicolor modulated beam; and, (g) projecting at least one diffracted light beam from the multicolor modulated beam toward a scanning element to direct the at least one diffracted light beam toward the display surface as a line of image pixels.

41. A method for selectively forming a color pixel either using P vertex color light sources or P+1 vertex color light sources, the method comprising the steps of:

(a) providing a control signal for enabling each of either P or P+1 vertex color light sources as source illumination, based on an image data value for the color pixel;

(b) providing image modulation data to one or more light modulators for modulating the source illumination from either the P or the P+1 vertex color light sources to provide a color image; and (c) wherein P is an integer equaling 4.

42. A method for selecting a color gamut including a first, a second, and a third vertex color, comprising the steps of:

(a) selecting the first vertex color from a first color light source;

(b) selecting the second vertex color from a second color light source; and (c) selecting the third vertex color from a third color light source and a fourth color light source.

43. The method according to claim 42 wherein the third vertex color contains light simultaneously emitted from both the third and the fourth color light sources.

44. The method according to claim 42 wherein the third vertex color contains light emitted either from the third color light source or from the fourth color light source.

* * * * *